June 24, 1930.  E. E. BASHOR ET AL  1,767,114
TRACTOR HITCH
Filed April 18, 1927   2 Sheets-Sheet 1

Inventors
Emery E. Bashor,
Edward N. Wray.
By A. J. O'Brien
Attorney

June 24, 1930. E. E. BASHOR ET AL 1,767,114
TRACTOR HITCH
Filed April 18, 1927 2 Sheets-Sheet 2
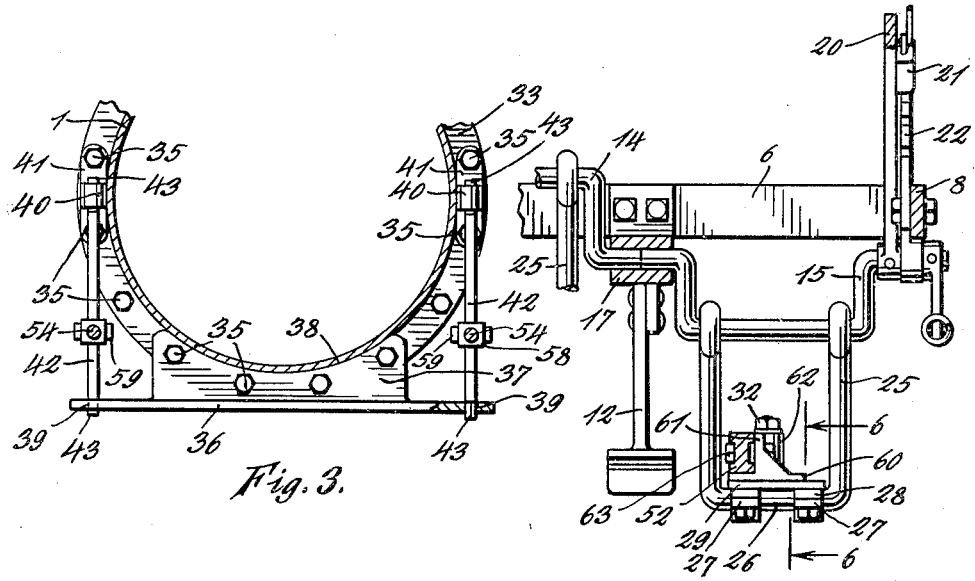
Inventors
Emery E. Bashor,
Edward N. Wray.
By A. J. O'Brian
Attorney Patented June 24, 1930

1,767,114

UNITED STATES PATENT OFFICE

EMERY E. BASHOR AND EDWARD N. WRAY, OF BERTHOUD, COLORADO

TRACTOR HITCH

Application filed April 18, 1927. Serial No. 184,569.

This invention relates to improvements in the construction of tractor hitches of the type described and claimed in United States Letters Patent 1,620,937, granted March 15, 1927.

In the above identified patent a tractor hitch has been described and claimed which is very well adapted for certain uses. It has been found from experience that a somewhat better performance can be obtained if the tractor hitch shown and described in the above identified patent is modified in certain particulars, and it is to these modifications that the present application is directed.

The principal object of this invention is to produce a construction in which the plows will automatically adjust themselves so as to take a full furrow and which will also prevent them from taking more land than can be properly turned by the plow.

Another object of this invention is to provide a means for connecting the plow to the tractor that will cause the plow to automatically move outwardly whenever it is raised to inoperative position.

The above and other objects that may become apparent as the description proceeds are attained by means of the construction and an arrangement of parts that will now be described in detail, reference for this purpose being had to the accompanying drawings in which the preferred embodiment of the invention has been shown, and in which:

Fig. 3 is a section taken on line 3—3, Fig. 2;

Fig. 4 is a section taken on line 4—4, Fig. 2;

Fig. 5 is a section taken on line 5—5, Fig. 2; and

Fig. 6 is a section taken on line 6—6, Fig. 5.

Figure 2:
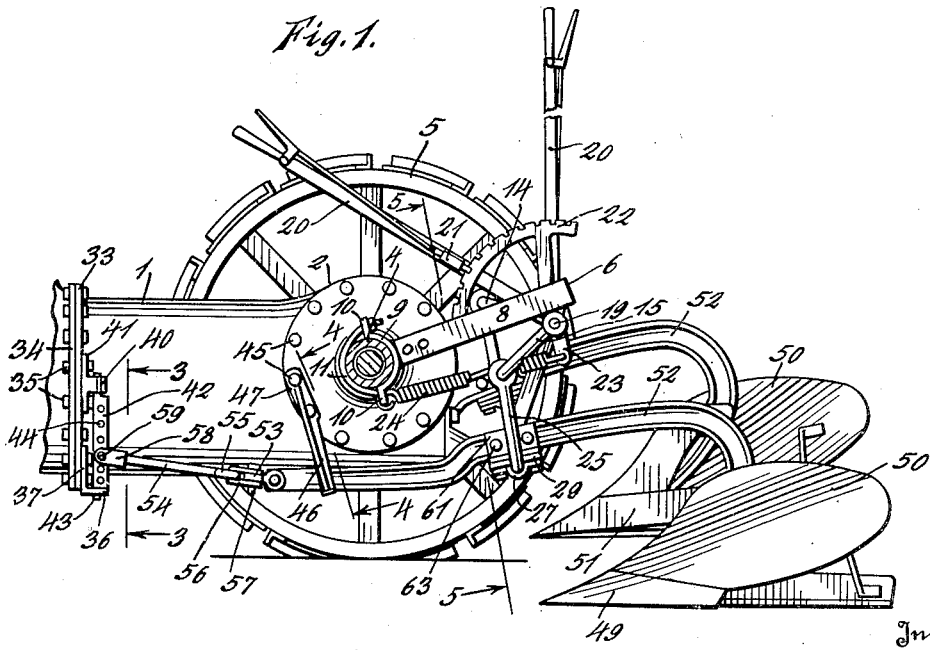
Fig. 2 is a section taken on line 2—2, Fig. 1.

Numeral 1 indicates a portion of the tractor. The rear part of member 1 terminates in a cylindrical portion 2, which forms the outer wall of a differential housing. Secured to the ends of the cylindrical part 2, are axle housings 3 and 4, at each end of which is located a drive wheel 5. As the tractor itself forms no part of this invention, a description thereof will not be made in greater detail than is absolutely necessary for a proper explanation of the invention. A U-shaped member 6 is provided with parallel arms 7 and 8 to whose ends are secured castings 9. These castings are provided with radially extending ears 10, which are perforated for the reception of a clamping bolt 11. This bolt extends around one side of the axle housing and with the casting 9 serves to connect the U-shaped member 6 to the axle housing in such a manner that it can oscillate about the same. A support 12 is secured to the base of the U-shaped member and is adapted to rest upon the lug 13 which projects rearwardly from the tractor. U-shaped bails 14 and 15 are pivotally connected to the U-shaped member 6 by means of bearings 16, 17 and 18. Each of said U-shaped bails has a trunnion 19 that extends through one of the bearings 16 or 18. A handle 20 is non-rotatably secured to each of the trunnions 19 and is provided with a pawl mechanism 21 that cooperates with teeth in a quadrant 22. Each of the handles 20 has a downwardly projecting arm 23 to the end of which a spring 24 is connected. The other end of this pring is connected to one of the ears 10 of the casting 9. This spring is under tension and exerts a force tending to move the arms 20 in a clockwise direction (Fig. 2). Pivotally connected with the U-shaped bails 14 and 15 are other U-shaped bails 25. Secured to the straight lower portion 26 of each of the bails 25 are two bearings each consisting of two cooperating parts 27 and 28, which, when asembled in the manner shown in Figure 6 encloses the straight part 26 of the bail 25. A plate 29 is secured to the upper surface of the parts 28 by some suitable means such as bolts 30. A pin 31 has its lower end secured to the plate 29 and extends upwardly therefrom in the manner shown in Figure 6. The upper end of this pin is threaded for the reception of a nut 32.

The assembly illustrated in Fig. 5 is part of the means for supporting the plows from the tractor and for raising and lowering them. Each combined raising and supporting means comprises a U-shaped bail 15; a U-shaped bail 25; the plate 29; the pin 31 and the bearing 62.

The part 1 of the tractor is provided at one end with a circular flange 33 that cooperates with a similar flange 34, which is integral with another part of the tractor body. These flanges are connected by a number of clamping bolts 35. A plate 36 has a flange 37 extending at right angles from one side thereof. This flange has one edge curved in the manner indicated by numeral 38 and is provided with openings for the reception of some of the clamping bolts 35, by means of which the flange 37 is bolted to the rear surface of the flange 33. The outer ends of the plate 36 are provided with openings 39, whose function will hereafter appear. Located directly above each of the openings 29 is a bearing member comprising a perforated lug portion 40 which projects from the center of the base 41. This base is provided with openings properly spaced for the reception of two of the bolts 35 by means of which it is secured to the flange 33. A bar 42 having each end provided with a journal 43 is located on each side of the tractor and is mounted for rotation in the vertically disposed openings in the ends of plate 36 and in the lugs 40. These bars are provided with spaced openings 44.

The axle housings 3 and 4 are secured to the cylindrical part 2 by means of a plurality of bolts 45. A bracket having a downwardly extending arm 46 is secured to the differential housing in the manner shown in Figures 2 and 4. This bracket has a base 47 that is perforated for the reception of two of the clamping bolts 45 by means of which it is securely held in place. It will be observed from Figure 1 that one of these brackets is located on each side of the differential housing and from Figure 4 it will be seen that the lower surface of the arm is inclined downwardly at an angle approximately forty-five degrees.

This tractor hitch is intended to be employed more particularly with a two-way plow, comprising a right and a left hand plow attached to the tractor in such a way that one can be held in inoperative position, while the other one is in operative position. By means of two plows of this type it is possible to plow a field by going backwards and forwards along one side thereof in a manner well understood. These plows are constructed in the same manner as ordinary plows and are each provided with a plowshare 49, a mold board 50 and a landslide 51. Each plow is also provided with a curved beam 52, to the front end of which is pivotally attached a perforated plate 53 whose plane lies in a direction parallel to the bottom of the plow. A draw bar 54 is provided at one end with an eye 55 through which a clevis 56 extends. This clevis is connected to the part 53 by means of a clevis pin 57. The other end of the draw bar 54 is provided with spaced fingers 58 that embrace the vertical bar 44 and is connected to the latter by means of a pin 59. It is evident that by moving the pin 59 upwardly or downwardly along the bar 42 that the depth at which the plow operates can be regulated. It is also evident that by moving the pin 47 along the member 53 that the width of the furrow can be regulated. The plow beams have been shown as extending through the bails 25 and are each provided with a bearing having a base 60 which is adapted to rest upon the upper surface of the plate 29. An upwardly extending wall 61 has a cylindrical enlargement 62 that is provided with an opening in which the pin 31 is journalled. These bearings are connected to the plow beams by means of bolts 63. Referring now to Figure 6, it will be observed that the axis of the pin 31 is upwardly and forwardly inclined with respect to the bottom of the plow.

From Figs. 5 and 6, it will be seen that the pins 31 have their axes in a longitudinally extending plane perpendicular to the plane on which the wheels 5 are supported. This forward and upward inclination of the pins is of considerable importance in this combination and results in an automatic regulation of the width of the furrow which is achieved thereby in a manner which will be more fully described hereinafter.

Figure 1:
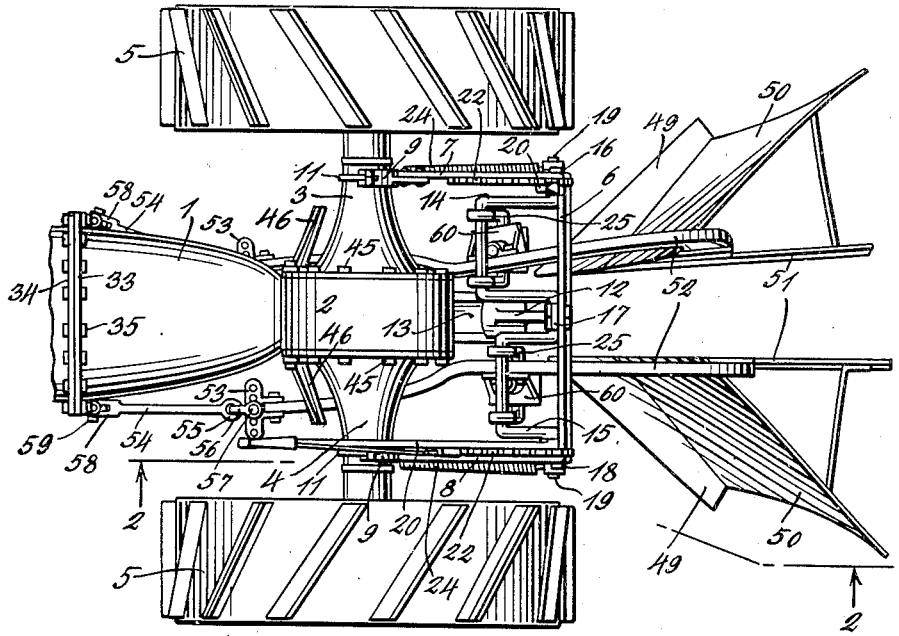
Fig. 1 is a top plan view of the rear end of the tractor showing a two-way plow attached thereto by means of the improved tractor hitch.

It is evident that when the bails 14 and 15 are rotated by means of the handles 20, the U-shaped bail 25 will be raised and lowered. When one of the handles is moved from the forwardly inclined position shown in Figure 2 to a vertical position shown in the same figure, the plow beam will be raised. As the plow is being raised the forward end of the beam which is overbalanced by the rear end of the beam and the plow that is attached to it will be tilted upwardly and will come in contact with the under side of the arm 46, and will slide along the under surface of the same until it reaches the dotted line position shown in Figure 4. This movement of the beam will cause it to rotate about the pin 31, whereby the plow will be tilted as shown in Figs. 1 and 2. After the front end of the beam has reached the dotted line position, Fig. 4, any further upward movement of the bail 25, will raise the plow upwardly. The extent of the upward movement must be sufficient to carry the plow from the level it assumes while operative to such a distance above the ground that it will clear the upper surface when in inoperative position. Owing to the rotation of the plow about the pin 31, which is inclined forwardly in the direction of travel, the plow will be turned slightly about an axis extending in the general direction of the length of the plow, which axis will be referred to herein as the longitudinal axis of the plow, whenever it is rotated about the pin. If we consider Figure 6, it is evident that if the pin 31 is maintained in its forwardly inclined position and the plow rotated ninety degrees about the axis of the pin, it will, at the same time be rotated about its longitudinal axis through an angle W which is equal to the forward angular inclination of the pin. When the plow is rotated to any other angle less than ninety degrees it will be rotated about its longitudinal axis through an angle which is proportionally the same part of angle W.

It is well known to those who are familiar with the operation of plows that if the top of the plow is tilted towards the landside, it will have a tendency to reduce the width of the furrow and in the same manner if it is tilted towards the side of the plow share, the width of the furrow will be increased. Bearing in mind the effect of the tilting just described, it will be observed that if, when the plow is in operation, it should for any reason move towards the land side, it will at the same time be tilted about its longitudinal axis and the top of the plow will be tilted inwardly towards the land side and this, as above explained, will tend to make the plow move in the other direction so as to decrease the width of the furrow. In the same manner, if, for any reason, the plow moves towards the side of the plowshare, so as to decrease the width of the furrow, it will be at the same time tilted in such a direction that it will increase the width of the furrow. This tilting about the longitudinal axis is due to the inclination of the pin 31 with respect to the plane of the bottom of the plow, and as a result of this a stabilizing action is obtained. When the plow is employed on hilly land, it will naturally have a tendency to slide down hill, but on account of the inclination of the pin 31, this tendency will be counteracted by the change in the angular position of the plow and therefore the width of the cut will remain constant regardless of the ordinary forces that tend to increase or decrease the same.

The combination described above comprises means for supporting the plow from the tractor and for raising and lowering it, means comprising the inclined bracket 46, shown in Fig. 4, for moving the front end of the plow inwardly when it is raised, and means comprising the upwardly and forwardly inclined pin 31 for rotating the plow about an axis extending in the general direction of its length whenever the front end is moved inwardly or outwardly.

From the above it will be apparent that the construction which has been described produces several desirable charactertistics that increase the efficiency of the plow and the convenience of handling the same. The outward movement of the plow, when raised from operative to inoperative position, provides a greater space between the plows and the tilting due to the inclined position of the pin also tends to raise the plow point. In addition to this the inclined arrangement of pin 31 produces the automatic adjustment just described.

Having thus described the invention what is claimed as new is:

1. A device of the class described, comprising, in combination, a tractor, a plow having a beam, and a supporting means carried by the tractor for raising and lowering the beam and plow, said means comprising a pin secured to the supporting means and a bearing member secured to the plow beam, the axis of the pin lying in a vertical plane parallel with the direction of movement of the plow and having an upward and forward inclination with respect to the bottom of the plow whereby the plow will be rotated about its longitudinal axis whenever it is rotated about the axis of the pin.

2. In a device of the class described, in combination, a tractor, a plow having a beam, means for connecting the front end of the beam to the tractor, means attached to the tractor and to the plow beam for raising and lowering the plow and means for moving the rear end of the plow outwardly from the center line whenever the plow is raised.

3. In a device of the class described, in combination, a tractor, a plow having a beam, means for connecting the front end of the beam to the tractor, means attached to the tractor and to the plow beam for raising and lowering the plow and means for moving the forward end of the plow beam inwardly when the plow is raised, said last named means comprising an outwardly and downwardly inclined bracket secured to the tractor and located directly above the front end of the plow beam.

4. In a device of the class described, in combination, a tractor, a plow having a beam, means for connecting the front end of the beam to the tractor, means attached to the tractor and to the plow beam for raising and lowering the plow, means for rotating the rear end of the plow outwardly from the center line whenever the plow is raised, and means for tilting the plow about its longitudinal axis whenever its rear end is moved outwardly or inwardly with respect to the center line of the tractor.

5. In a device of the class described, in combination, a tractor, a plow having a beam, means for attaching the front end of the beam to the tractor, means attached to the tractor and to the plow beam for raising and lowering the latter and means for moving the forward end of the plow beam inwardly and for tilting the plow about its longitudinal axis when it is raised, said last named means comprising a pivotal connection whose axis of rotation lies in a vertical plane extending in the direction of movement of the plow and which is forwardly and upwardly inclined, and an outwardly and downwardly inclined bracket secured to the tractor to the front of the supporting means and extending over the front end of the plow beam, whereby when the plow is raised it will also be rotated about the pivotal connection and tilted about its longitudinal axis.

6. A device of the class described comprising, in combination, a tractor, a plow having a beam, means for attaching the front end of the beam to the tractor, means for raising and lowering the plow, means for moving the front end of the plow beam inwardly when the plow is raised, and a pivotal connection between the beam and the tractor, said connection comprising a pivot inclined in the direction of travel whereby, when the plow moves about the axis of said pivot, it will also be tilted transversely of its longitudinal axis.

7. In a device of the class described, in combination, a tractor, a plow having a beam, means for connecting the front end of the beam to the tractor, means attached to the tractor and to the plow beam for raising and lowering the plow, means for moving the front end of the plow inwardly when it is raised and means for tilting the plow about its longitudinal axis whenever the front end of the beam is moved inwardly or outwardly.

In testimony whereof we affix our signatures.

EMERY E. BASHOR.
EDWARD N. WRAY.